United States Patent
Choi et al.

(10) Patent No.: US 7,792,215 B2
(45) Date of Patent: Sep. 7, 2010

(54) DIRECT-CONVERSION RECEIVER AND SUB-HARMONIC FREQUENCY MIXER THEREOF

(75) Inventors: Byoung Gun Choi, Daegu (KR); Chul Soon Park, Daejeon (KR); NoGil Myoung, Daejeon (KR)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 1181 days.

(21) Appl. No.: 11/403,819

(22) Filed: Apr. 14, 2006

(65) Prior Publication Data

US 2007/0242779 A1    Oct. 18, 2007

(51) Int. Cl.
*H04L 27/22* (2006.01)
*H04L 27/00* (2006.01)
*H04B 1/30* (2006.01)

(52) U.S. Cl. .................. 375/316; 375/324; 455/324; 329/305

(58) Field of Classification Search ............ 375/316, 375/324, 332, 339–340, 349, 377; 329/302, 329/304–306, 323–327, 337–338, 346, 358–359, 329/317, 315; 455/323, 326, 259, 318, 130–131, 455/139, 276.1, 313, 324; 331/76, 44

See application file for complete search history.

(56) References Cited

U.S. PATENT DOCUMENTS

| | | | | |
|---|---|---|---|---|
| 5,339,040 A * | 8/1994 | Loper | .......................... | 329/358 |
| 5,787,126 A * | 7/1998 | Itoh et al. | ................... | 375/340 |
| 5,995,819 A * | 11/1999 | Yamaji et al. | ................ | 455/326 |
| 6,016,422 A * | 1/2000 | Bartusiak | ...................... | 455/76 |
| 6,026,286 A * | 2/2000 | Long | .......................... | 455/327 |
| 6,348,830 B1 * | 2/2002 | Rebeiz et al. | ................ | 327/355 |
| 6,564,045 B1 * | 5/2003 | Fransis | ....................... | 455/318 |
| 7,031,688 B2 * | 4/2006 | Malone et al. | .............. | 455/318 |
| 7,085,548 B1 * | 8/2006 | Kluge et al. | ................. | 455/323 |
| 7,120,414 B2 * | 10/2006 | Kim et al. | .................... | 455/313 |
| 7,130,604 B1 * | 10/2006 | Wong et al. | ................. | 455/302 |
| 7,248,850 B2 * | 7/2007 | Shen | .......................... | 455/318 |
| 7,369,837 B2 * | 5/2008 | Kim | ........................... | 455/322 |
| 7,386,286 B2 * | 6/2008 | Petrovic et al. | ........... | 455/165.1 |

(Continued)

OTHER PUBLICATIONS

Magrini et al. A Balanced Sub-Harmonic Mixer for Multi-OFDM Ultra Wide Band Direct Conversion Transmitters, Sep. 10-15, 2006, Micowave Conference, 2006, 38th Eurpoean, pp. 1574-1577.*

(Continued)

*Primary Examiner*—Tesfaldet Bocure
*Assistant Examiner*—Lawrence B Williams
(74) *Attorney, Agent, or Firm*—Bacon & Thomas, PLLC

(57) ABSTRACT

Provided is a sub-harmonic frequency mixer having a structure in which two terminals of transistors receiving a Radio Frequency (RF) signal and a Local Oscillation (LO) signal are coupled. The frequency mixer is composed of a single-level structure of transistors and thus can be driven at a lower supply voltage compared to a common frequency mixer. A direct-conversion receiver employing such a frequency mixer needs an RF signal and an LO signal sources of single-phase. Therefore, the direct-conversion receiver has an architecture that simplifies a whole RF transceiver circuit and thus can be advantageously applied in implementing SoC (System-on-Chip) for a low power, high integration, low price and subminiature wireless transceiver circuit.

13 Claims, 6 Drawing Sheets

U.S. PATENT DOCUMENTS

| | | | | |
|---|---|---|---|---|
| 7,454,185 | B2* | 11/2008 | Park et al. | 455/302 |
| 7,460,849 | B2* | 12/2008 | Gard et al. | 455/318 |
| 7,483,678 | B2* | 1/2009 | Rozenblit et al. | 455/73 |
| 7,542,521 | B2* | 6/2009 | Choi et al. | 375/316 |
| 2004/0063419 | A1* | 4/2004 | Molnar et al. | 455/323 |
| 2004/0190647 | A1* | 9/2004 | Malone et al. | 375/322 |
| 2006/0229042 | A1* | 10/2006 | Afsahi et al. | 455/232.1 |
| 2007/0072575 | A1* | 3/2007 | Sowlati et al. | 455/318 |
| 2007/0155350 | A1* | 7/2007 | Razavi et al. | 455/147 |
| 2008/0287088 | A1* | 11/2008 | Bao et al. | 455/333 |

OTHER PUBLICATIONS

Shimozawa et al., A Novel Sub-Harmonic Pumping Direct Conversion Receiver With High Instantaneous Dynamic Range, Jun. 17-21, 1996, Microwave Symposium Digest, 1996, IEEE MTT-S International, vol. 2, pp. 819-822.*

Upadhyaya et al., A New 5-Ghz ISM Band CMOS Doubly Balanced Sub-Harmonic Mixer for Direct Conversion Receiver, 2004, Wireless Technology, 2004, 7th European Conference on, pp. 65-68.*

Upadhyaya, P. et al., A New 5-GHz ISM Band CMOS Doubly Balanced Sub Harmonic Mixer For Direct Conversion Receiver, 2004, Wireless Technology, 2004, 7th European Conference on, pp. 65-68.*

Zhiheng et al., Direct Conversion for Flex Paging Receivers-A Feasibility Study, Jun. 7-9, 1998, Radio Frequency Integrated Circuits (RFIC) Symposium, 1998 IEEE, pp. 293-296.*

* cited by examiner

DIRECT-CONVERSION RECEIVER AND SUB-HARMONIC FREQUENCY MIXER THEREOF

FIELD OF THE INVENTION

The present invention relates to a wireless reception unit and a sub-harmonic frequency mixer thereof, and more particularly, to a direct-conversion receiver and a direct-conversion frequency mixer thereof, which are capable of obtaining quadrature baseband signals by using a Local Oscillation (LO) signal and a Radio Frequency (RF) signal.

BACKGROUND OF THE INVENTION

FIG. 1 is a schematic configuration of a conventional direct-conversion receiver using a sub-harmonic frequency mixer. The direct-conversion receiver shown in FIG. 1 comprises a poly-phase filter 130, an LNA 150, an in-phase channel frequency mixer 110 and a quadrature phase channel frequency mixer 120. The poly-phase filter 130 generates LO signals for in-phase channels of 0°, 90°, 180° and 270°, and LO signals for quadrature channels of 45°, 135°, 225° and 315°. The LO signals for the in-phase channels generated by the poly-phase filter 130 are provided to the in-phase channel frequency mixer 110 to produce +I and −I signals as in-phase baseband signals. The LNA 150 amplifies an RF signal received thereto while minimizing noise.

Meanwhile, the LO signals for the quadrature phase channels generated by the poly-phase filter 130 are provided to the quadrature phase channel frequency mixer 120 to create +Q and −Q signals as quadrature phase baseband signals.

The poly-phase filter 130 is composed of a multi-stage resistor-capacitor circuit that causes large loss, which results in a large power loss in the LO signals. Hence, in order to compensate the power loss in the LO signals caused by the poly-phase filter 130, an LO amplifier 140 is arranged before or after of the poly-phase filter 130 for each phase of the LO signals. Such an additional LO amplifier 140, 171, 172, 174 and 177 makes not only the whole receiver structure complicated but also the power consumption high.

FIG. 2 presents a detailed circuitry diagram of any one of the sub-harmonic frequency mixers, e.g., 110 depicted in FIG. 1.

Substantially, such a type of the sub-harmonic frequency mixer 100 has been proposed to remedy a dc-offset problem with an existing direct down-conversion transceiver wherein the RF signal and the LO signal have the same frequency. In the sub-harmonic frequency mixer 100, a frequency of the LO signal is set to have half that of the RF signal. This sub-harmonic frequency mixer 110 performs a frequency conversion of the RF signal using a second harmonic component of the LO signal.

The sub-harmonic frequency mixer 110 has a stacked configuration of an RF signal input unit 112 and an LO signal input unit 114 that are composed of transistors. In the sub-harmonic frequency mixer 110, in order to produce the in-phase baseband signals +I and −I, there are required four LO signals of 0°, 90°, 180° and 270° having 90° phase difference with each other, and of two RF signals having 180° phase difference with each other. Further, in order to produce the quadrature phase baseband signals +Q and −Q, there are needed four LO signals of 45°, 135°, 225° and 315° having phase difference of 90° with each other, in addition to the four LO signals having 90° phase difference as set forth above. Thus, a separate mixer for quadrature phase channel frequency is needed thereto. As a result, total eight LO signals having 45° phase difference with each other and two RF signals having 180° phase difference with each other are necessary to obtain the entire baseband signals +I, −I, +Q and −Q.

As described above, the sub-harmonic frequency mixers 110 and 120 employed in the direct-conversion receiver 100 has a plurality of transistors stacked in a multi-stage fashion. However, such a multi-stage fashion can not guarantee a sufficient voltage swing at its output end under a limited supply voltage and thus makes the inevitable use of high supply voltage.

SUMMARY OF THE INVENTION

Therefore, an object of the present invention is to provide a direct-conversion receiver capable of ensuring a sufficient output voltage swing and of driving at a low supply voltage.

Another object of the invention is to provide a sub-harmonic frequency mixer with a simple structure and low power consumption for use in a direct conversion receiver.

In accordance with an aspect of the present invention, there is provided a direct-conversion receiver, comprising: a Radio Frequency (RF) phase shifter for dividing an RF signal provided thereto into RF signals having phases of 0° and 90°; a Local Oscillation (LO) phase shifter for dividing an LO signal provided thereto into LO signals having phases of 0° and 90°; a single-phase channel frequency mixer for producing a baseband single-phase component by using the RF signal having 0° phase and the LO signals having 0° and 90° phases; and a quadrature phase channel frequency mixer for producing a quadrature phase component by using the RF signal having 90° phase and the LO signals having 0° and 90° phases.

In accordance with another aspect of the present invention, there is provided a sub-harmonic frequency mixer for use in a direct-conversion receiver, comprising: a first pair of transistors whose emitters and collectors are connected to each other, respectively; and a second pair of transistors whose emitters and collectors are connected to each other, respectively,
wherein an RF signal is inputted to each of bases of first transistors in each of the first and second pairs, and quadrature LO signals are applied to bases of second transistors in each of the first and second pairs, respectively, to thereby generate baseband signals to make a down-frequency conversion.

BRIEF DESCRIPTION OF THE DRAWINGS

The above and other objects and features of the present invention will become apparent from the following description of preferred embodiments given in conjunction with the accompanying drawings, in which:

FIGS. 4A and 4B are detailed circuitry diagrams of the direct down-conversion receiver shown in FIG. 3 in which FIG. 4A is a circuitry diagram of a first embodiment using a BJT (a Binary Junction Transistor) and FIG. 4B is a circuitry diagram of a second embodiment using a FET (a Field Effect Transistor)

DETAILED DESCRIPTION OF THE PREFERRED EMBODIMENTS

Hereinafter, preferred embodiments of the present invention will be described in detail with reference to the accompanying drawings.

Figure 1:
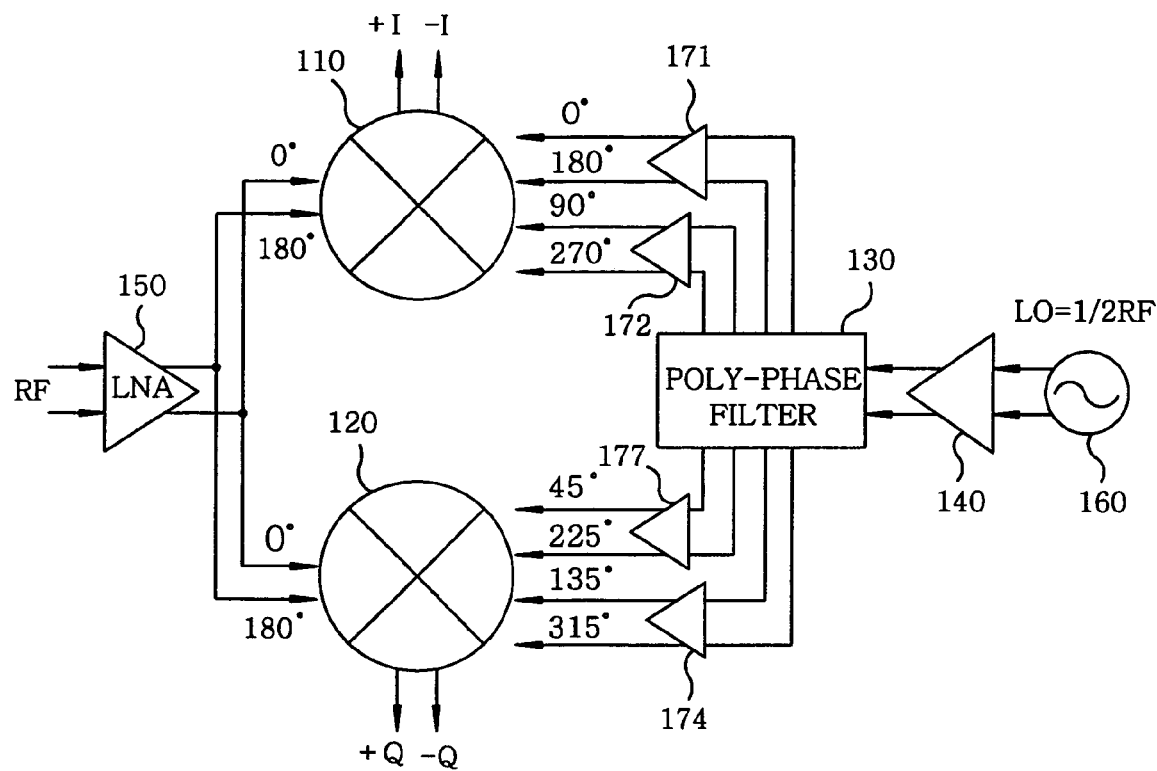
FIG. 1 shows a schematic configuration of a conventional direct down-conversion receiver.
Figure 2:
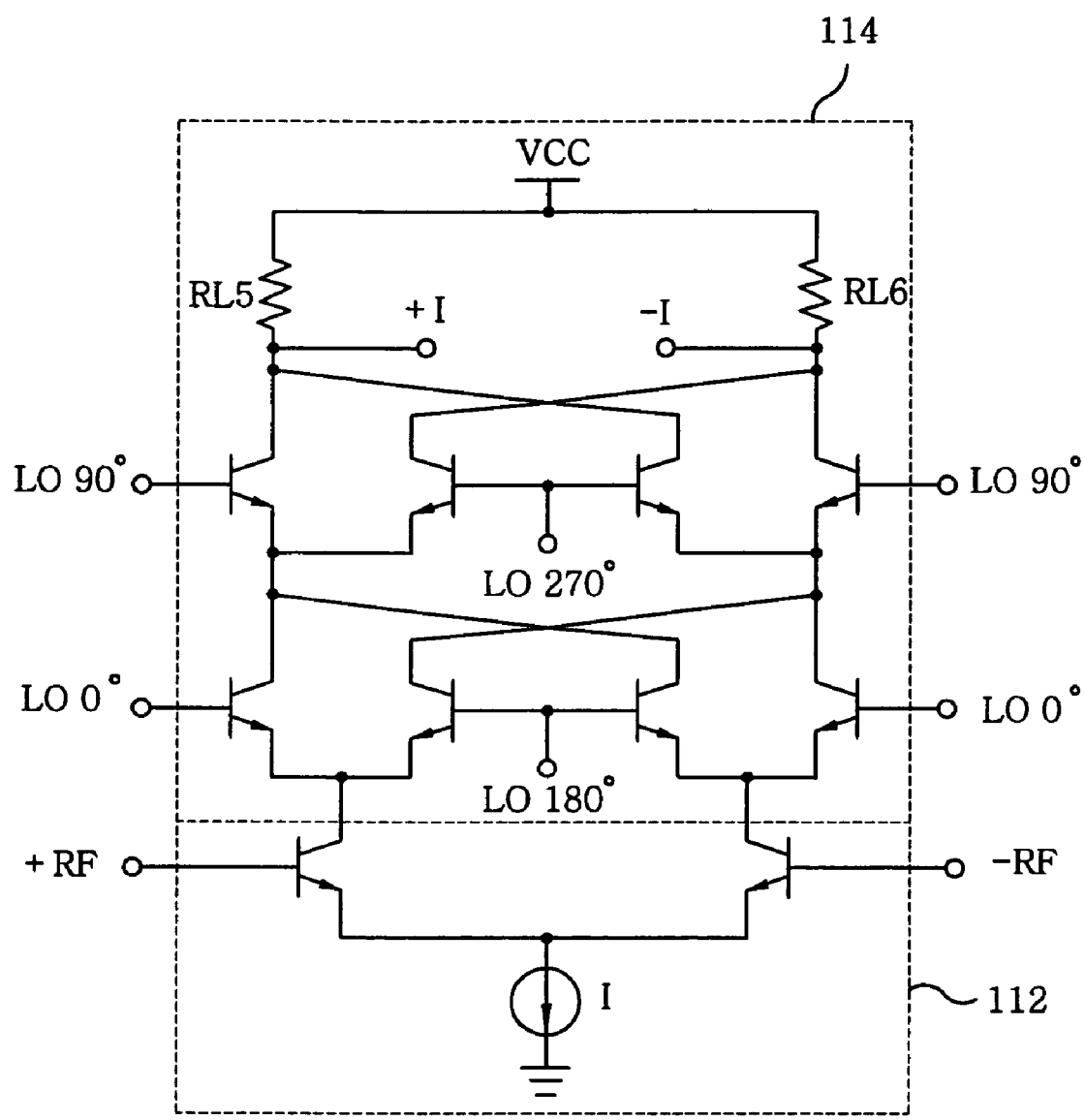
FIG. 2 provides a detailed circuitry diagram of the sub-harmonic frequency mixer shown in FIG. 1.
Figure 3:
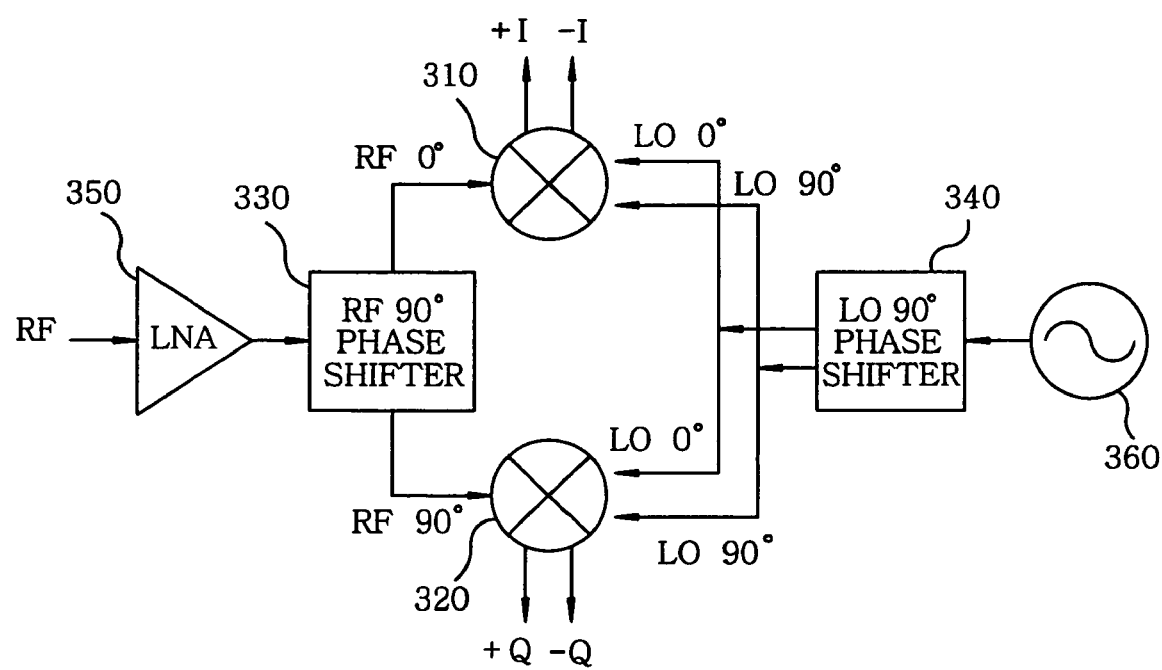
FIG. 3 is a schematic configuration of a direct down-conversion receiver in accordance with the present invention.

Referring to FIG. 3, there is shown a schematic configuration of a direct down-conversion receiver in accordance with the present invention. As shown therein, the direct-conversion receiver comprises an in-phase channel frequency mixer (hereinafter referred to as an I-channel frequency mixer) 310, a quadrature phase channel frequency mixer (hereinafter referred to as a Q-channel frequency mixer) 320, an RF 90° phase shifter 330, an LO 90° phase shifter 340, a Low Noise Amplifier (LNA) 350 and a Voltage Controlled Oscillator (VCO) 360.

First, an RF signal is received by an antenna (not shown) and is applied to the LNA 350. The RF signal is of a single-phase signal, not a differential signal. The LNA 350 amplifies the received RF signal while minimizing noise therein.

The output from the LNA 350 is then provided to the RF 90° phase shifter 330 by which the single-phase RF signal is orthogonally divided into two RF signals having phases of 0° and 90°. The divided RF signal having 0° phase is fed to the I-channel sub-harmonic frequency mixer 310, while the RF signal having 90° phase is fed to the Q-channel sub-harmonic frequency mixer 320.

In the meantime, an LO signal having half of the RF signal frequency is created by the VCO 360, and is provided to the LO phase shifter 340 wherein the LO signal is also of a single-phase signal, not a differential signal. The LO signal is orthogonally divided into two LO signals having phases of 0° and 90° by the LO phase shifter 340. The divided 0° and 90° LO signals are then applied to the I-channel sub-harmonic frequency mixer 310 and the Q-channel sub-harmonic frequency mixer 320, respectively.

According to a preferred embodiment of the present invention as set forth above, it is possible to make a topology of the circuit configuration simply and lower the power consumption because the LNA 350 and the VCO 360 produce the single-phase RF signal and the single-phase LO signal, respectively. In addition, by using the LO 90° phase shifter 340 in place of the poly-phase filter embedded in the prior art as described above, it is possible to decrease the power loss of the LO signals and further reduce the power consumption because the direct-conversion receiver does not require an LO buffer amplifier. Each of the mixers 310 and 320 generates an in-phase component I and a quadrature component Q of desired signals whose center frequencies are a difference between RF frequency ($f_{RF}$) and a twice of LO frequency ($f_{2LO}$).

Figure 4A:
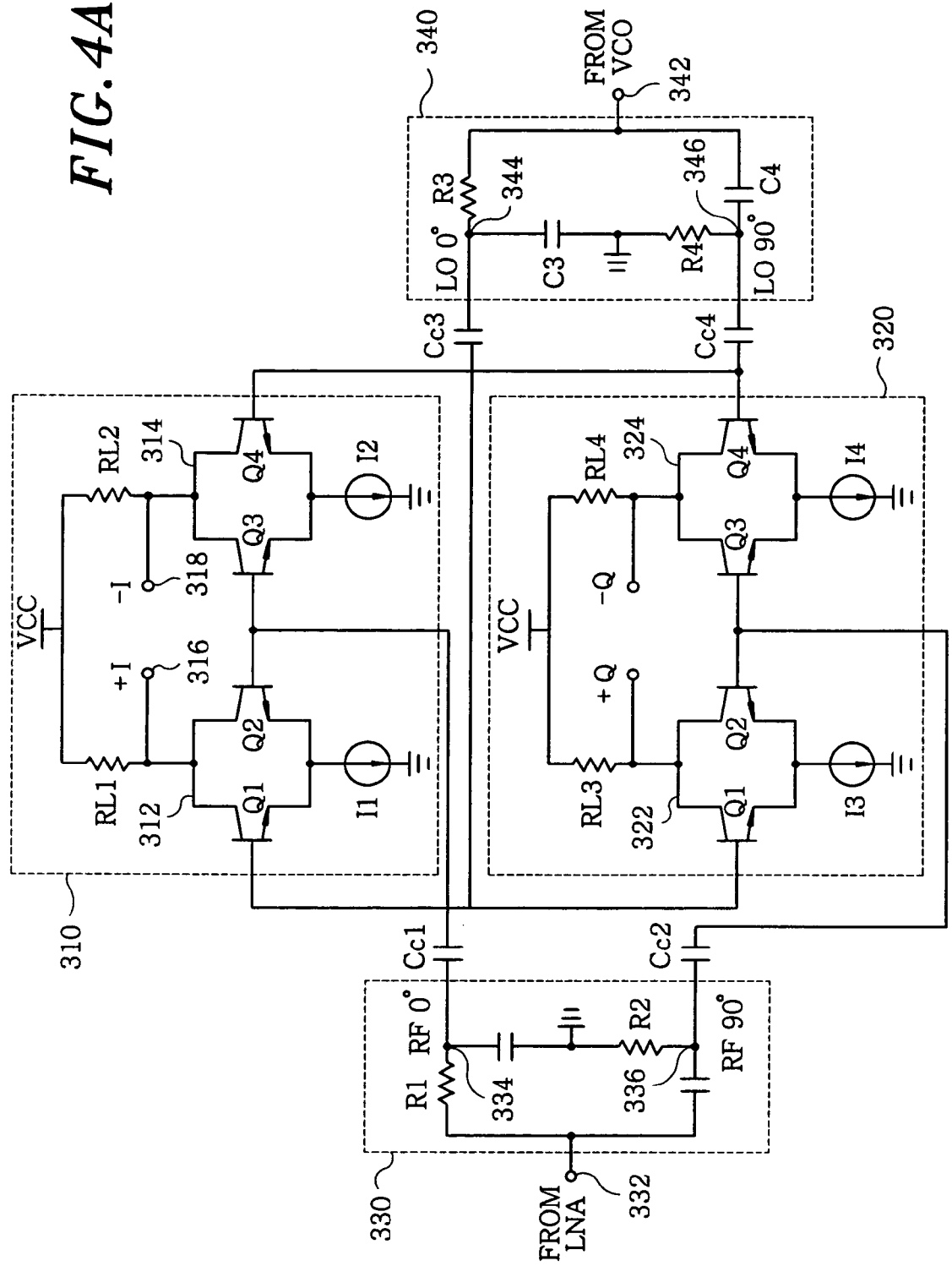
Figure 4B:
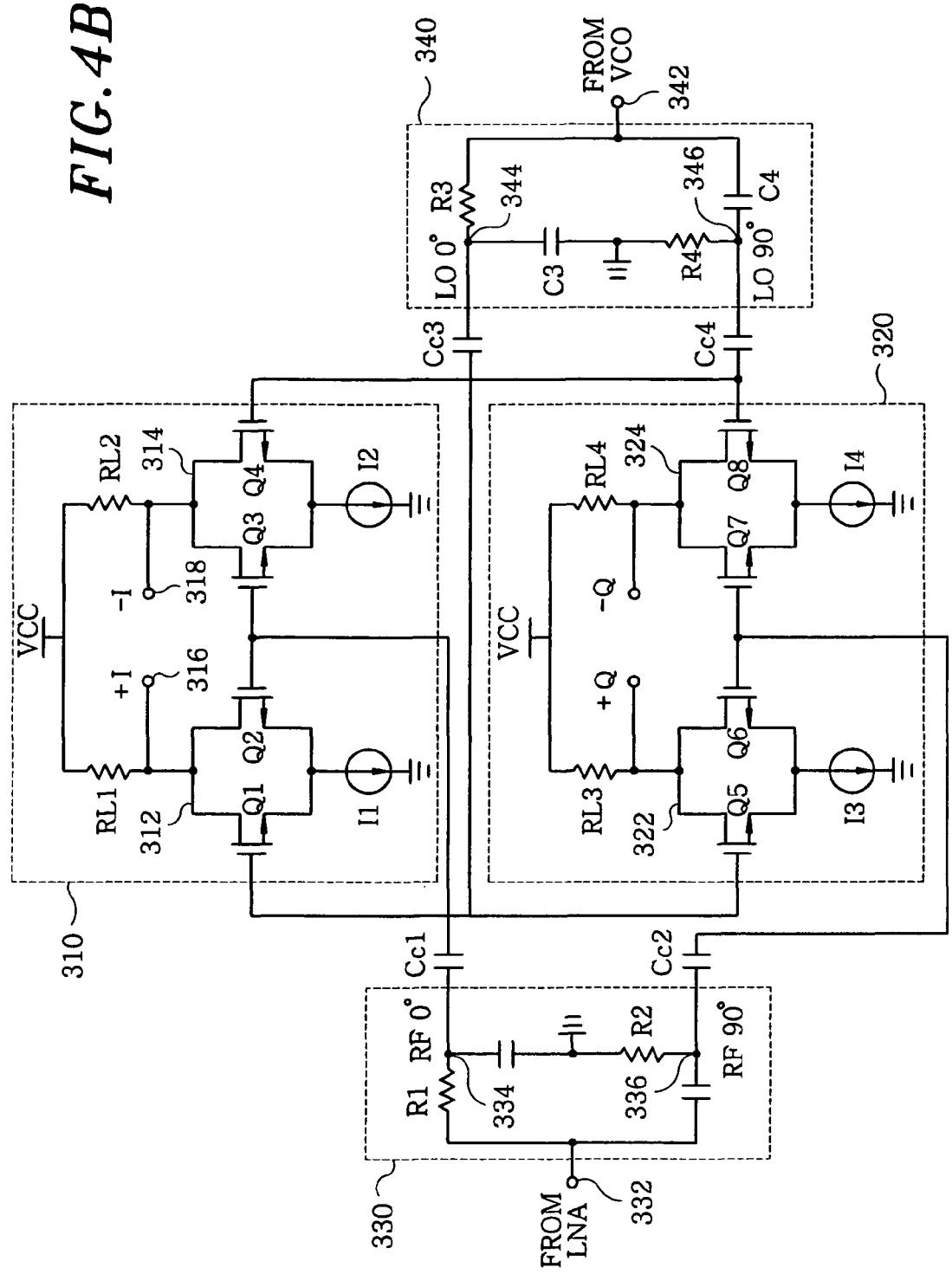

FIGS. 4A and 4B are detailed circuit diagrams of the direct-conversion receiver shown in FIG. 3.

As shown in FIG. 4A, the RF 90° phase shifter 330 is connected to the output of the LNA 350; and receives a single-phase RF signal via its RF input node 332. The RF 90° phase shifter 330 functions to divide the RF signal into two RF signal having phase difference of 90°. The RF 90° phase shifter 330 is comprised of RC-CR network in which a resistor R1 and a capacitor C2 are connected in parallel to the RF input terminal 332, and a capacitor C1 and a resistor R2 are coupled between two output terminals 334 and 336 that issues two RF signals having phase of 0° and 90°.

On the other hand, the LO 90° phase shifter 340 is connected to the output of the VCO 360; and receives a single-phase LO signal via its LO input node 342. The LO 90° phase shifter 340 serves to divide the single-phase LO signal into two LO signals having phase of 0° and 90°. Similarly to the RF 90° phase shifter 330 shown in FIG. 4A, the LO 90° phase shifter 340 is composed of an RC-CR network in which a resistor R3 and a capacitor C4 are coupled in parallel with the LO input node 342, and a capacitor C3 and a resistor R4 are coupled between two output nodes 344 and 346 that provide two LO signals having phase of 0° and 90°, respectively. The values of capacitance and resistance in each phase shifter 330 and 340 are optimized to operate at RF and LO frequencies in order to minimize the phase and amplitude mismatches between I channel and Q channel.

Figure 5:
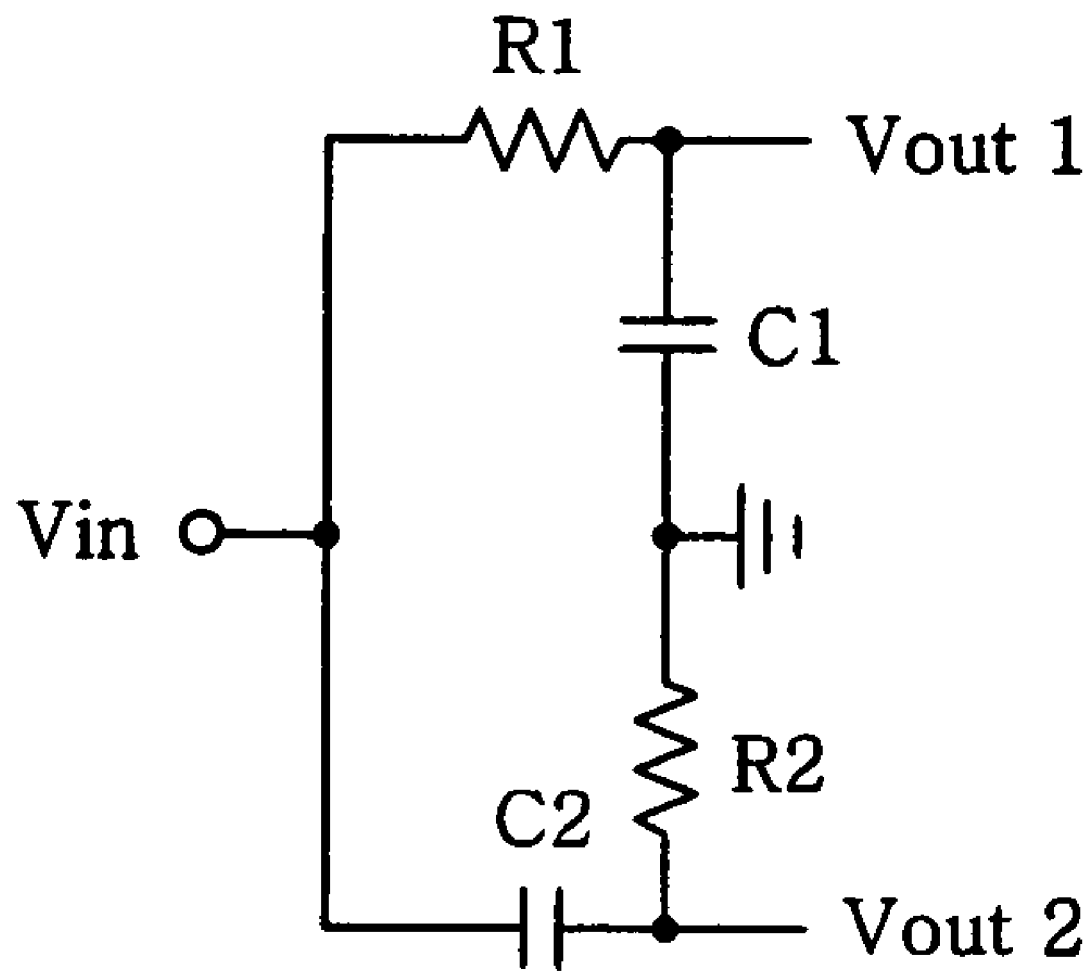
FIG. 5 illustrates an operational principle of the 90° phase shifter shown in FIGS. 4A and 4B.

An operational principle of one, e.g., of the 90° phase shifters will be described with reference to FIG. 5.

If it is assumed that an input signal Vin is of 0°, a phase of an output Vout1 is shifted by −45°, compared to the phase of the input signal Vin, by an RC-CR network of resistors R1, R2 and capacitors C1, C2. Meanwhile, a phase of an output Vout2 is shifted by +45°, compared to the phase of the input signal Vin, by the RC-CR network. Therefore, the signals having phase difference of 90° can be obtained from between the two outputs Vout1 and Vout2, as calculated below Equations.

$$\frac{V_{out1}}{V_{in}} = \frac{1}{1 + j\omega R_1 C_1} \quad \text{Eq. (1)}$$

$$\text{If } \omega = \frac{1}{R_1 C_1},$$

$$\frac{V_{out1}}{V_{in}} = \frac{1}{1+j} = \frac{\sqrt{2}}{2} \angle -45°$$

$$\frac{V_{out2}}{V_{in}} = \frac{1}{1 + j\omega R_1 C_1} \quad \text{Eq. (2)}$$

$$\text{If } \omega = \frac{1}{R_1 C_1},$$

$$\frac{V_{out2}}{V_{in}} = \frac{j}{1+j} = \frac{\sqrt{2}}{2} \angle +45°$$

If the resistor and capacitor values are combined to allow a multiplication of the two values to be consistent with a frequency of each of the RF signals and the LO signals, signals having same magnitude but 90° phase difference from each other can be obtained at output nodes of the 90° phase shifter 330. The RF signals having phase of 0° and 90° produced by the RF 90° phase shifter 330 are then fed to the I-channel mixer 310 and the Q-channel mixer 320, respectively.

In the meantime, an operation of the LO 90° phase shifter 340 is substantially identical to that of the 90° RF phase shifter 330; and therefore, detailed description thereof will be omitted for the sake of simplicity. The LO signals having phase of 0° and 90° obtained by the LO 90° phase shifter 340 are then delivered to the I-channel mixer 310 and the Q-channel mixer 320, respectively.

The I-channel mixer 310 includes two transistor pairs 312 and 314 whose emitters and collectors are respectively coupled with each other. In the transistor pairs 312 and 314, each of the transistors Q1 to Q4 includes a Bipolar Junction Transistor (BJT). Inputted to bases of the transistors Q2 and Q3 in each of the transistor pairs 312 and 314 is the RF signal having 0° phase from the RF 90° phase shifter 330; and applied to another bases of the transistors Q1 and Q4 in each of the transistor pairs 312 and 314 is the LO signal having 0° phase from the LO 90° phase shifter 340. Further, connected between an emitter common node and a ground of each of the transistor pairs are current sources that provide bias currents I1 and I2, respectively.

Likewise, the Q-channel mixer 320 includes two transistor pairs 322 and 324 whose emitters and collectors are coupled with each other, respectively. An input to bases of the transistors Q6 and Q7 in each of the transistor pairs 322 and 324 is the LO signal having 90° phase from the LO 90° phase shifter 340; and an input to another bases of the transistors Q5 and Q8 in each of the transistor pairs 322 and 324 is the LO signal having 90° phase from the LO 90° phase shifter 340.

In operation, first of all, single-phase LO signals having 0° and 90° phases are applied to the transistors Q1 and Q4, respectively. And single-phase RF signals having 0° and 90° phases are fed to the transistors Q2 and Q3 with same bias conditions as the transistors Q1 and Q4 and that make pairs therewith, respectively. In this circuit arrangement, a frequency mixing is made by the LO signals having a relatively high power compared to the RF signals, so that baseband signals having a 180° phase difference and a frequency of $f_{RF}\text{-}f_{2LO}$ are produced at +I and −I output nodes 316 and 318.

More specifically, the transistors Q1 and Q4 have nonlinear characteristics because of receipt of the LO signal having a higher power than that of the RF signal, thereby creating harmonic frequency components corresponding to an integral multiple of the LO signal frequency due to such nonlinear characteristics. In other words, there occurs frequencies of $f_{LO}, f_{2LO}, f_{3LO}, \ldots$ and, in turn, output frequency components corresponding to a multiplication of these frequency components and a frequency component $f_{RF}$ of the RF signal are generated. As a result, such frequency components as $f_{RF} \pm f_{LO}$, $f_{RF} \pm f_{2LO}$ and $f_{RF} \pm f_{3LO}$ are produced at the output nodes 316 and 318 of the I-channel mixer 310 and a desired down-converted frequency component of $f_{RF}\text{-}f_{2LO}$ can be obtained by low pass filtering.

Output currents $i_2$ and $i_3$ incurred by the RF signal may be linearly represented as follows:

$$i_{2,3} = i_S\left\{\exp\left(\frac{qv_{RF}}{kT}\right) - 1\right\} \cong i_S \frac{q}{kT} v_{RF} = I_2 \cos\omega_{RF} t, \quad \text{Eq. (3)}$$

$$\text{for } v_{RF} \leq \frac{kT}{q} \text{ (linear)}$$

The transfer functions of the transistors Q1 and Q4 by the LO signal may be given by the following equations with nonlinear characteristics.

$$f(Q_1) = S\left\{\exp\left(\frac{qv_{LOL0°}}{kT}\right) - 1\right\} \quad \text{Eq. (4)}$$

$$= S\left(\frac{q}{kT} v_{LOL0°} + \frac{1}{2}\left(\frac{q}{kT}\right)^2 v_{LOL0°}^2 + \frac{1}{6}\left(\frac{q}{kT}\right)^3 v_{LOL0°}^3 + \cdots\right)$$

$$= A_0 + A_1\cos\omega_{LO} t + A_2\cos2\omega_{LO} t + A_3\cos3\omega_{LO} t + \cdots$$

$$f(Q_4) = A_0 + A_1\cos\left(\omega_{LO} + \frac{\pi}{2}\right)t + \quad \text{Eq. (5)}$$

$$A_2\cos2\left(\omega_{LO} + \frac{\pi}{2}\right)t + A_3\cos3\left(\omega_{LO} + \frac{\pi}{2}\right)t + \cdots$$

$$\text{for } v_{LOL0°,90°} > \frac{kT}{q} \text{ (nonlinear)}$$

Output voltages can be defined by a multiplication of the currents by the RF signal as in Eq. (3), to the LO transfer functions of Eqs. (4) and (5) and load resistors RL1 and RL2, as indicated in Eqs. (6) and (7). Namely, the output voltages across the load resistors RL1 and RL2, having differential baseband output voltage components that is 180° difference in phase and is same in magnitude, can be detected by a low pass filter (not shown).

$$v_{o1} = i_2 f(Q_1) R_L \quad \text{Eq. (6)}$$
$$= I_2 R_L \cos\omega_{RF} t \times (A_0 + A_1\cos\omega_{LO} t + A_2\cos2\omega_{LO} t + A_3\cos3\omega_{LO} t)$$
$$= \frac{I_2 R_L A_2}{2} \times \cos(\omega_{RF} - 2\omega_{LO}) t \quad \text{(after low pass filter)}$$

$$v_{o2} = i_3 f(Q_4) R_L \quad \text{Eq. (7)}$$
$$= -\frac{I_2 R_L A_2}{2} \times \cos(\omega_{RF} - 2\omega_{LO}) t \quad \text{(after low pass filter)}$$

FIG. 4B is a detailed circuitry diagram illustrating another embodiment of the direct-conversion receiver shown in FIG. 3. The embodiment of FIG. 4B is substantially identical to that of FIG. 4A except that Field Effect Transistors (FETs) are used therein in lieu of BJTs. Therefore, in the embodiment of FIG. 4B, the bases, emitters and collectors given in the embodiment of FIG. 4A will be designated as gates, sources and drains, respectively; and therefore, a further description of the same elements will be omitted.

In comparison with a frequency mixer of a conventional Gilbert cell structure, the input nodes of the LO signals and the RF signals are not formed in a multi-level but arranged in a same level; and therefore, sufficiently large output voltages can be obtained at the output terminals, +I and −I nodes, even under lower supply voltage. Accordingly, since the frequency receiver of the present invention can provide the sufficient output voltages while using the low supply voltage, this circuit architecture is adaptable for a low power circuit.

In addition, by help of the use of the RF 90° phase shifter at the RF input section, the structure of the frequency mixer can be more simplified because the single-phase RF signal is adopted therein, instead of differential RF signals. And also, since the LO 90° phase shifter has a smaller number of resistor-capacitor stages at the LO input section compared to the common poly-phase filter, the power loss of the LO signals can be reduced. Reducing the power loss of the LO signals does not need the LO amplifier that has been used to compensate the loss of the LO signals by the existing poly-phase filter, thereby further decreasing the power dissipation of the overall receiver.

As described above, the present invention can contribute to a low power and low cost implementation of mobile communication terminals by considerably reducing the number of components used in the direct-conversion receiver and thus simplifying the whole structure and alleviating power consumption. Furthermore, the invention enables the use of lower supply voltage owing to a single-level design of the sub-harmonic frequency mixer circuit. Moreover, the invention can share analog and digital circuits that follow the receiver and a power because of the use of low supply power in a high frequency circuit. Through such features, microwave circuits and analog/digital circuits can be implemented on a single chip, which can highly contribute to the development of a System-on-Chip (SoC).

While the invention has been shown and described with respect to the preferred embodiments, it will be understood by those skilled in the art that various changes and modifications may be made without departing from the spirit and scope of the invention as defined in the following claims.

What is claimed is:

1. A direct-conversion receiver comprising:
    a Radio Frequency (RF) phase shifter for dividing an RF signal provided thereto into RF signals having phases of 0° and 90°;
    a Local Oscillation (LO) phase shifter for dividing an LO signal provided thereto into LO signals having phases of 0° and 90°;
    a single-phase channel frequency mixer for producing a baseband single-phase component by using the RF signal having 0° phase and the LO signals having 0° and 90° phases; and
    a quadrature phase channel frequency mixer for producing a quadrature phase component by using the RF signal having 90° phase and the LO signals having 0° and 90° phases,
    wherein the single-phase channel frequency mixer includes first and second pairs of transistors whose emitters and collectors are coupled with each other; and
    wherein the RF signal having 0° phase is applied to bases of first transistors in each of the first and second pairs and the LO signals having 0° and 90° phases are fed to bases of second transistors in each of the first and second pairs, respectively, to thereby cause a down-frequency conversion.

2. The direct-conversion receiver of claim 1, wherein the quadrature phase channel frequency mixer includes a first and a second pairs of transistors whose emitters and collectors are coupled with each other; and wherein the RF signal having 90° phase is inputted to bases of first transistors in each of the first and second pairs and the LO signals having 0° and 90° phases are provided to bases of second transistors in each of the first and second pairs, respectively, to thereby cause a down-frequency conversion.

3. The direct-conversion receiver of claim 1, wherein the RF phase shifter is comprised of an RC-CR network.

4. The direct-conversion receiver of claim 1, wherein the LO phase shifter is comprised of an RC-CR network.

5. The direct-conversion receiver of claim 1, further comprising a low noise amplifier for amplifying the RF signal to be provided to the RF phase shifter.

6. The direct-conversion receiver of claim 1, further comprising an LO signal generator for generating the LO signal to be provided to the LO phase shifter, the LO signal having half a frequency of the RF signal.

7. A sub-harmonic frequency mixer for use in a direct-conversion receiver, comprising:
    a first pair of transistors whose emitters and collectors are connected to each other, respectively; and
    a second pair of transistors whose emitters and collectors are connected to each other, respectively,
    wherein an RF signal is inputted to each of bases of first transistors in each of the first and second pairs, and quadrature LO signals are applied to bases of second transistors in each of the first and second pairs, respectively, to thereby generate baseband signals to make a down-frequency conversion.

8. The sub-harmonic frequency mixer of claim 7, wherein the RF signal is a single-phase signal and the LO signals have phase difference of 90° with each other and have half of a frequency of the RF signal.

9. A direct-conversion receiver comprising:
    a Radio Frequency (RF) phase shifter for dividing an RF signal provided thereto into RF signals having phases of 0° and 90°;
    a Local Oscillation (LO) phase shifter for dividing an LO signal provided thereto into LO signals having phases of 0° and 90°;
    a single-phase channel frequency mixer for producing a baseband single-phase component by using the RF signal having 0° phase and the LO signals having 0° and 90° phases; and
    a quadrature phase channel frequency mixer for producing a quadrature phase component by using the RF signal having 90° phase and the LO signals having 0° and 90° phases,
    wherein the quadrature phase channel frequency mixer includes first and second pairs of transistors whose emitters and collectors are coupled with each other; and
    wherein the RF signal having 90° phase is inputted to bases of first transistors in each of the first and second pairs and the LO signals having 0° and 90° phases are provided to bases of second transistors in each of the first and second pairs, respectively, to thereby cause a down-frequency conversion.

10. The direct-conversion receiver of claim 9, wherein the RF phase shifter is comprised of an RC-CR network.

11. The direct-conversion receiver of claim 9, wherein the LO phase shifter is comprised of an RC-CR network.

12. The direct-conversion receiver of claim 9, further comprising a low noise amplifier for amplifying the RF signal to be provided to the RF phase shifter.

13. The direct-conversion receiver of claim 9, further comprising an LO signal generator for generating the LO signal to be provided to the LO phase shifter, the LO signal having half a frequency of the RF signal.

* * * * *